United States Patent [19]
Clary et al.

[11] Patent Number: 5,333,189
[45] Date of Patent: Jul. 26, 1994

[54] COMMUNICATIONS PROTOCOL FOR SWITCHING SYSTEMS

[75] Inventors: Robert S. Clary, Anaheim; Lars T. Rymert, Huntington Beach, both of Calif.

[73] Assignee: Telefonaktiebolaget L M Ericsson, Stockholm, Sweden

[21] Appl. No.: 91,474

[22] Filed: Jul. 13, 1993

Related U.S. Application Data

[63] Continuation of Ser. No. 544,839, Jun. 27, 1990, abandoned.

[51] Int. Cl.$^5$ .............................................. H04M 3/00
[52] U.S. Cl. ..................................... 379/242; 379/94; 379/102
[58] Field of Search .................... 379/242, 61, 269, 98, 379/100, 102, 93, 94

[56] References Cited

U.S. PATENT DOCUMENTS 4,768,218 8/1988 Yorita ..................................... 379/61
5,048,078 9/1991 Satomi et al. ........................ 379/100

OTHER PUBLICATIONS

Ericsson Review No. 2, 1982 entitled "Data Communications in MD 110" pp. 67–75, by Barnicoat et al.
Ericcson Review No. 2, 1982, entitled "Diavox Courier 700, Digital System Telephone for MD 110".
PC/Computing "How it works, Error Protocols" by Ron White, pp. 204–205, May 1990.

Primary Examiner—James L. Dwyer
Assistant Examiner—Ahmad F. Matar
Attorney, Agent, or Firm—Johnson & Gibbs

[57] ABSTRACT

In a switching network including a central system and at least one end point device connected to the central system, a protocol for communicating between the central and the at least one end point device includes a plurality of signals that may be transmitted from the end point device to the central system, and a plurality of signals that may be transmitted from the central system to the end point device.

16 Claims, 3 Drawing Sheets

| NBYTES | OPC/IND | SIGNAL # | FUNCTION REQ | ADDITIONAL DATA | NUMBER DATA | ⟩⟩ | CHECKSUM |
|---|---|---|---|---|---|---|---|
| D00 XXH | D01 XXH | D02 XXH | D03 XXH | D04 XXH | D05 XXH | ⟩⟩ | DXX |

| NYBYTES | OPC/IND | SIGNAL # | EQUIPMENT DATA | ⟩⟩ | EQUIPMENT DATA | CHECKSUM |
|---|---|---|---|---|---|---|
| D00 XXH | D01 XXH | D02 XXH | D03 XXH | ⟩⟩ | D12 XXH | D13 XXH |

| NYBYTES | OPC/IND | SIGNAL # | ACTIVATION DATA | ⟩⟩ | CHECKSUM |
|---|---|---|---|---|---|
| D00 XXH | D01 XXH | D02 XXH | D03 XXH | ⟩⟩ | DXX XXH. |

| NYBYTES | OPC/IND | SIGNAL # | CHECKSUM |
|---|---|---|---|
| D00 XXH | D01 XXH | D02 XXH | D03 XXH |

| NYBYTES | OPC/IND | SIGNAL # | TYPE | STATUS | ADDITIONAL DATA | ⟩⟩ | CHECKSUM |
|---|---|---|---|---|---|---|---|
| D00 XXH | D01 XXH | D02 XXH | D03 XXH | D04 XXH |  | ⟩⟩ | DXX XXH |

COMMUNICATIONS PROTOCOL FOR SWITCHING SYSTEMS

This is a continuation of application Ser. No. 07/544,839, filed Jun. 27, 1990 (now abandoned).

CROSS REFERENCE TO RELATED APPLICATIONS AND PATENTS

This application is related to the following U.S. Patent Applications:

Application Ser. No. 08/020,031 entitled "Language Independent Self-Centering Menu Handling of Traffic Recording Presentation" and application Ser. No. 08/107,337 entitled "Monitor Screen Graphic Value Indicator System". This application is also related to U.S. Pat. No. 5,163,055 entitled "Communication System Using a Fault Tolerant Protocol" and U.S. Pat. No. 5,181,204 entitled "Method and Apparatus for Error Tracking in a Multitasking Environment".

All cross referenced applications have been filed on even date herewith and assigned to the assignee of the present invention. All of these ralated applications are hereby incorporated herein by reference.

BACKGROUND OF THE INVENTION

1. Field of the Invention

The present invention relates to interfaces within communications systems and, more particularly, to a protocol that may be used between a private automatic branch exchange (a "PABX") and voice and data terminals connected to the PABX.

2. Description of Related Art:

Voice and data switching systems typically comprise a central system and end point devices connected to the central system via extension lines. The end point may be either analog devices or digital devices. Examples of analog end point devices are modems and rotary (or tone based) telephone sets. Examples of digital end point devices are terminal adaptor units ("TAU's", which are also referred to as data circuit equipment or "DCE") and digital telephones.

In general, analog devices communicate with the central system via manipulations of the electrical interface characteristics of the extension line. With such a communication scheme, features and functions are generally restricted to those that are available within the central system and which can be reached by such a limited signalling capability. Digital devices, on the other hand, which are usually restricted to a given PABX, typically incorporate advanced signalling channels over the extension line interface. These advanced signalling channels can operate to increase the communication level between the end point devices and the system.

Digital lines now supported by a number of PABX's are examples of the aforementioned extension lines. These digital lines can allow better control of transmission parameters to and from digital telephones. Further, these digital lines are capable of allowing implementations of more sophisticated protocols than those presently used. In addition, as the interfaces between the TAU's and the system, and between the TAU's and the terminals, are constantly evolving the family of TAU's is rapidly expanding. This is potentially advantageous as the more sophisticated the protocol used to communicate between systems and, e.g., digital telephones, the more sophisticated the features that can be implemented into the digital telephones or other such voice and/or data terminals.

The protocol used on a digital extension between a PABX and its associated feature phones and TAU's is always unique to each PABX manufacturer because feature phones and data interfaces are always custom designed and proprietary. Because price comparisons among PBX's are typically done based upon cost per line, heretofore it has been common to minimize cost of feature phones and TAU's by providing them with only simple features and by using simple protocols to communicate their activities to the central software corresponding to the state of the device known by the central software.

Became development heretofore has progressed based upon the simple feature/simple protocol philosophy discussed above, presently, each time a new data device is introduced with new features, new state tables need to be introduced in the call processing software. Because compatibility with all previous devices is also generally maintained, call processing software has been growing and continues to grow larger and larger. Each feature addition or improvement involves a change in both the terminal adaptor firmware and in the state tables in the call processing software. Needless to say, the above methods for dealing with changes are inefficient and have become ungainly. It is a shortcoming and deficiency of the prior art that a better method for dealing with improved TAU's has not been developed.

Although no prior art materials which either disclose or suggest the protocol disclosed and claimed herein are known, there are a number of prior art references which bear some relation to the subject matter of the present invention. These references are U.S. Pat. Nos. 4,530,051 and 4,256,926. Each of these references is discussed briefly below.

U.S. Pat. No. 4,530,051 to Johnson et al. is directed to a method and apparatus for executing parts of a program process on two processors of a multiprocessor system. Johnson et al. describe a complex messaging system where intraprocess messages need to be sent among different processors.

U.S. Pat. No. 4,256,926 to Pitroda et al. is directed to a microprocessor control complex for a telecommunication switching system. Pitroda et al. describe a then-new Wescom PABX and its protocol between the attendant console and the PABX.

Review of the above-described references reveals no teachings of a solution such as that presented herein to the inefficiencies, shortcomings and deficiencies of the prior art discussed above.

SUMMARY OF THE INVENTION

The present invention overcomes the shortcomings and deficiencies of the prior art by providing a switching system protocol including a plurality of signals that may be transmitted from an end point device to a central system and a plurality of signals that may be transmitted from the central system to the end point device. The various signals relate to device and system functions, parameters and states.

The present invention provides a grouping of high level messages which are function oriented and not device specific. Using such messages, in systems practicing the protocol of the present invention the number of state tables in the call processing software are reduced and smarter terminal adapters which can process their own low level state tables may be accommodated.

Accordingly, it is an object of the present invention to provide a protocol that allows early introduction of additional features as well as new data devices in certain communication systems.

Another object of the present invention is to provide a protocol that increases system real-time processing capacity due to decentralization of the low level processing load.

Yet another object of the present invention is to provide a protocol that obviates the need for a change in call processing software and/or terminal adapter firmware each time a feature in a system is enhanced or optimized.

Still yet another object of the present invention is to provide a protocol that allows implementation of more flexible maintenance and fault recovery within certain systems because terminal adapters within such system take care of low level tasks.

A further object of the present invention is to facilitate and enhance communication by automated devices became such devices can be easily interfaced to terminal adapters for unattended automatic functions and for taking advantage of the local processing power.

BRIEF DESCRIPTION OF THE DRAWINGS

For a more complete understanding of the present invention, and for further objects and advantages thereof, reference may now be had to the following detailed description taken in conjunction with the accompanying drawings in which:

FIG. 4 is a block diagram of an equipment function request signal according to the teachings of the present invention;

FIG. 5 is a block diagram of an equipment data message signal according to the teachings of the present invention;

FIG. 6 is a block diagram of an equipment function activate signal according to the teachings of the present invention;

FIG. 7 is a block diagram of an equipment data request signal according to the teachings of the present invention; and FIG. 8 is a block diagram of a call status indication signal according to the teachings of the present invention.

DETAILED DESCRIPTION OF THE INVENTION

Although the present invention is hereinafter described with reference to a particular environment and application, those skilled in the art will recognize and appreciate that the protocol of the present invention has wide applicability to situations in which two intelligent devices are interconnected for communication, data transfer and similar purposes. The specific embodiment described below thus merely constitutes one embodiment of the present invention, which embodiment has actually been implemented and found to work extremely well.

Figure 1:
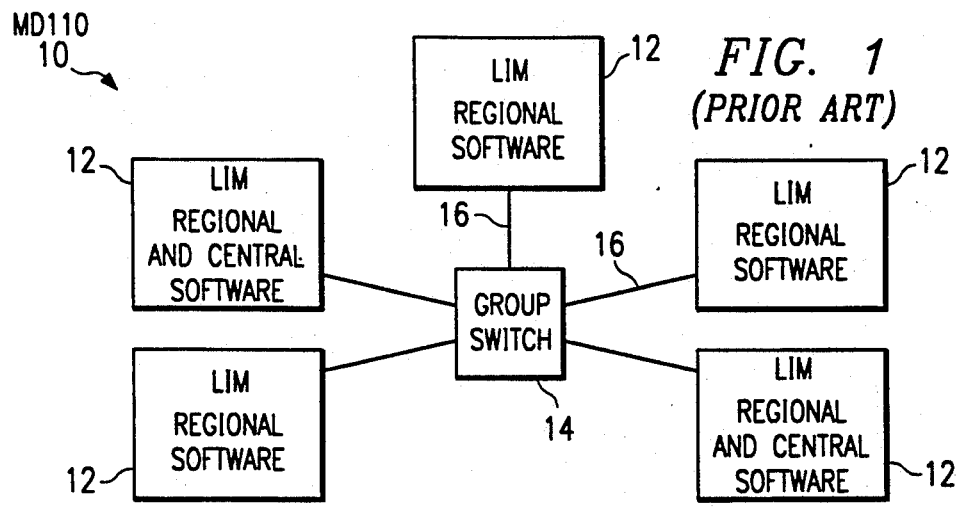
FIG. 1 is a block diagram of a conventional switching system including line interface modules.

With the above understanding, referring now to FIG. 1, shown therein is a block diagram of portions of a certain communications system 10, designated the MD110 Intelligent Network, manufactured by the assignee of the present invention. At the heart of this system 10 is one or more line interface modules 12 (or "LIMs"), five of which are shown in the system depicted in FIG. 1. The various LIMs are interconnected by a group switch 14 using links 16 carrying a standard PCM format.

System 10 software is divided into central and regional operating segments. Each LIM contains all of the necessary regional software to ensure complete control of call processing within the LIM (intra-LIM communications). Inter-LIM communications are controlled by central software, which is accessed as required by a LIM originating call processing to another LIM. Central software is duplicated in multiple LIMs for added reliability.

Figure 2:
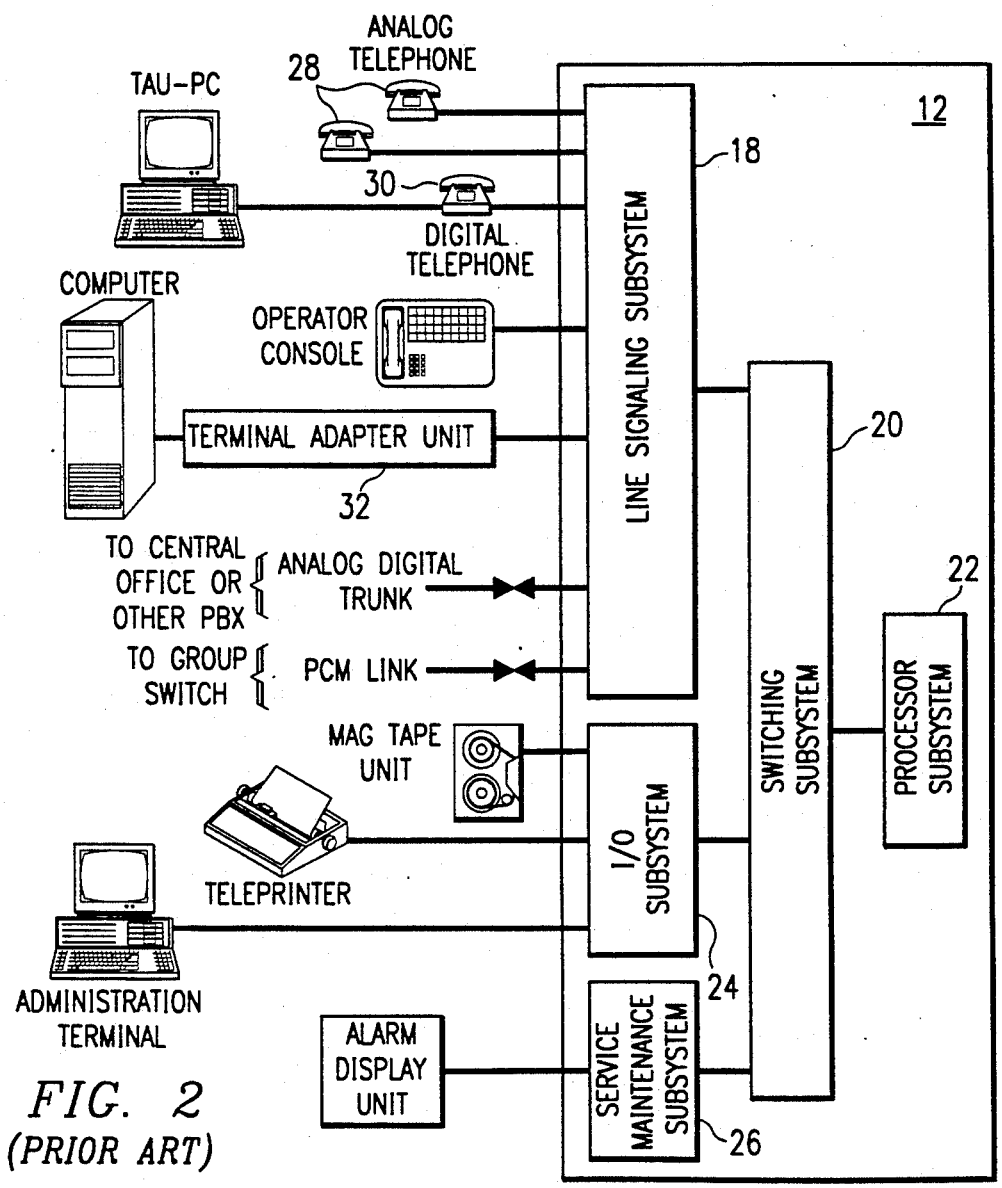
FIG. 2 is a block diagram of a line interface module such as those shown in FIG. 1.

Referring now to FIG. 2, further details regarding LIMs are set forth in the form of a typical LIM block diagram. Each LIM consists of five hardware subsystems: (1) a line signalling subsystem containing interface circuit 18 (connecting the LIM with voice/data devices) and the service circuits for call processing functions; (2) a switching system 20 to permit two-way communication between the station trunks, and other equipment; (3) a processor subsystem 22 to direct all functions of the LIM processor; (4) an input/output subsystem 24 to provide a man-machine interface for system administration and maintenance; and a service/maintenance subsystem 26 to monitor system hardware and software, detect faults, generate alarms, and aid in fault clearing. Also shown in FIG. 2 are a multitude of various peripheral devices that can be connected to LIMs. These peripheral devices may be seen in FIG. 2 to include analog telephones 28, digital telephones (e.g., telephone 30), TAUs (e.g., TAU 32), as well as a number of other devices.

Figure 3:
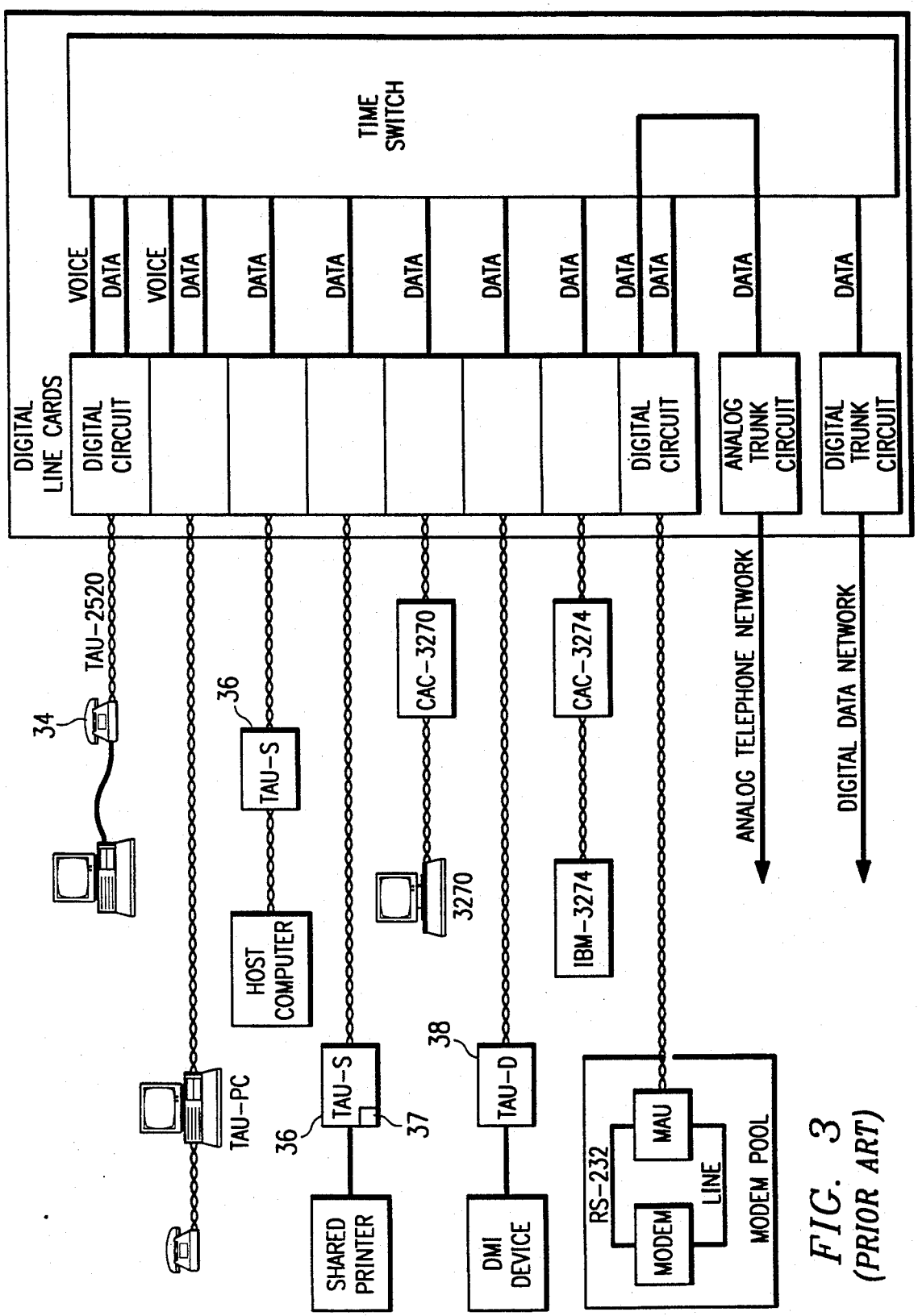
FIG. 3 depicts certain data communications aspects of the system of FIG. 1.

Referring now to FIG. 3, shown therein is a block diagram depicting data communication aspects of system 10. Internally, the system 10 may be seen to make no distinction between data and voice transmissions. Voice and data communications are performed independently or simultaneously using only a single twisted pair of wires. Data devices and digital telephone sets utilize the same digital line card. Data communications capability can be added or relocated using TAUs, e.g., the TAU models TAU 2520 34, TAU-S 36, and TAU-D 38, all manufactured by the assignee of the present invention, shown in FIG. 3.

Typical conventional TAUs, like models TAU-S and TAU-D manufactured by the assignee of the present invention, allow both asynchronous and synchronous operation. In an environment involving a system such as system 10, digital-to-analog or analog-to-digital conversion is not necessary for internal data switching. All TAUs operate in either full or half duplex modes. Typical TAUs have the flexibility to enable appropriate signals on the RS-232-C interface on data terminal equipment with various control requirements. In addition, conventional TAUs provide the proper characteristics such as speed, number of start/stop bits, interface type, and modes of transmission.

As mentioned in the description of related art section above, stimulus-response signaling is presently the standard method for propagating signals in switching system environments.

As also mentioned in the description of related art section above, such signalling has a number of shortcomings and deficiencies, which shortcomings and deficiencies are accentuated by certain relatively recent developments. For example, TAUs with increasingly sophisticated features, such as keyboard dialing and directories, are now being developed. Heretofore, to deal with these features more states have been added to the central software. This can and has required in some cases updates to the firmware of old devices so that they remain compatible with new software releases. Also, this method of handling increasingly sophisticated TAU residence features has required increasingly large amounts of real time.

In order to manage the increased complexity of TAUs and to keep the compatibility of old devices with an everchanging central software, the inventors of the present invention decided several fundamental technical changes were appropriate. First, it was recognized that distribution of some system intelligence, e.g., manipulatable or otherwise usable data stored in a memory, at the device level would be desirable. Such distribution could allow such a device (e.g., TAU 36 in FIG. 3) to locally process its own state table or sub-states of the main table in the control element 22 of the appropriate LIM 12 (see FIG. 2). Such a state table could be stored in a memory subcomponent (designated by reference numeral 37 in FIG. 3) of TAU 36. In making such a distribution, trade-offs in separating main-states from sub-states were deemed prudently made, recognizing that main-states should be stable, that is, not updated at each software release. Second, a higher level of communication protocol, comprising state-oriented signals, was developed.

The present invention effectively glows end point devices to track states simultaneously with central software. Having such state data readily available within a TAU (e.g., in the memory 37 of TAU 36) allows system intelligence also, i.e., means for acting upon the state information, to also be stored in the TAU. Advantages of such a distribution are numerous.

As should occur to those persons skilled in the relevant art upon reading this document, the distribution of the state tables and the functionally oriented signalling taught herein allow both state-machine control of TAUs, increased functionality, and more flexibility in the design of both TAUs and central software. Noteworthy advantages of state-machine control include isolation from digital telephone sets, more independent development evolution from the central software, and better fault recovery because the state machine is better defined and the messages are state oriented. Noteworthy advantages of increased functionality include end-to-end compatibility (equipment configuration per call basis, class of service functionality restriction, accommodation of a larger range of data devices and improved maintenance functions).

By way of example only, set forth below is a technical description of one possible embodiment of the present invention. This example should be of significant utility for those skilled in the art to understand and appreciate the structure and operation taught herein. It may be helpful to read this description while referring to FIGS. 4, 5, 6, 7 and 8, wherein the various signals are schematically shown.

TECHNICAL DESCRIPTION

Implementation Description

The signals described in the following sections of this document are intended to cover a broad range of applications and contain features/functions which are not fully supported in present day switching systems. The intention is to provide an open-ended signal design which can be expanded as new features are supported without affecting already designed devices.

In the following descriptions, the signals are defined with parameters for all possible feature/function applications.

Outgoing Signals (Device --> System)

| Signal Name | Description |
| --- | --- |
| EQUFNCREQ | Equipment Function Request<br>- feature initiation request<br>- feature cancellation request<br>- clear call request<br>- line check (test) request<br>- activation request<br>- long space detected<br>- no-activity detected<br>- follow me req. w/number info.<br>- call request w/number info. |
| EQUDATMES | Equipment Data Message<br>- Data I/F Status |

Equipment Function Request

The Equipment Function Request signal is multipurpose signal with a unique signal number followed by a number of parameters. Each parameter has a specific meaning and is located in a fixed position within the signal.

Signal Name: . EQUFNCREQ
Sender: Device
Receiver: System
Return Signal:
Description:

| | | |
| --- | --- | --- |
| D00 | XXH | NBYTES |
| D01 | XXH | OPC/IND |
| D02 | XXH | SIGNAL # |
| D03 | XXH | FUNCTION REQ (See below) |
| D04 | XXH | ADDITIONAL DATA INDICATION (See Below) |
| D05 | XXH | NUMBER DATA |
| \| | \| | |
| DXX | | CHECKSUM |

Detailed Description:

D03　　00=Clear call
　　　　01=Activate and update request
　　　　02=Long Space detected
　　　　03=No Activity detected
　　　　04=Line Check request
　　　　05=CWF activate request
　　　　06=CWF deactivate request
　　　　07=Local Mode activate request
　　　　08=Local Mode deactivate req.
　　　　09=CAD activate request
　　　　0A=CAD deactivate request
　　　　0B=Clear all initiated features
　　　　0C=dial data call request
　　　　0D=Dial tele call request
　　　　0E=Follow me request
　　　　0F=Follow me cancel xx=any value passed from the DTE via proprietary KBD command D04　　00=no additional data
　　　　01=more digits to follow
　　　　02=last digits
D05　　<B3−B0> = first digit　　(0 − F)
　　　　<B7−B4> = second digit　(0 − F)
D06　　<B3−B0> = third digit　　(0 − F)

-continued

```
|
D22
        0 = digit 0
        1 = digit 1
        |
        A = digit*
        B = digit*
        F = no digits left in signal
```

Equipment Data Message

The Equipment Data Message signal is used to inform the system of changes in the local data parameters with respect to the RS-232 interface (Note: of course, any number of interfaces can also be used with the protocol of the present invention, such interfaces specifically including RS-422 and X 21 interfaces). This signal is sent whenever a change in the RS-232 interface parameters is detected by the device (typically as a result of local autobaud/format detection). 1 This signal is also sent in response to an Equipment Data Request (EQUDATREQ).

```
Signal Name:      EQUDATMES

Sender:           Device
Receiver:         System
Return Signal to: EQUDATREQ
Description:
  D00  XXH   NBYTES
  D01  XXH   OPC/IND
  D02  XXH   SIGNAL #
  D03  XXH   EQUIPMENT DATA (See below)
   |    |
  D12  XXH   EQUIPMENT DATA (See below)
  D13  XXH   CHECKSUM Detailed Description:

D03  <B7–B0>  0 = rate xxxxx bps
                 |
                 x = rate xxxxx bps
  D04  <B7–B0>  0 = 7-bits
                 1 = 8-bits
                 2 = 9-bits
  D05  <B7–B0>  0 = synchronous
                 1 = 1-stop bit
                 2 = 1.5-stop bit
                 3 = 2-stop bits
  D06  <B7–B0>  0 = No parity
                 1 = Even parity
                 2 = Odd parity
                 3 = Mark parity
                 4 = Space parity
  D07  <B7–B0>  0 = Format
                 1 = Clear Channel
                     w/M-handshake
                 2 = Clear Channel
                     no handshake
                 3 = DMI Mode 0
                 4 = DMI Mode 1
                 5 = DMI Mode 2
                 6 = ECMA
  D08  <B7–B0>  0 = no protocol
                 1 = error correcting protocol
  D09  <B7–B0>  0 = no flow control
                 1 = switched flow control
                 2 = inband flow control
  D10  <B7–B0>  0 = RS-232 I/F
                 1 = RS-422 I/F
                 2 = V.35    I/F
  D11  <B7–B0>  0 = No data inscription
                 1 = inscription type 1
                 2 = inscription type 2
  D12  <B7–B0>  0 = No data compression
                 1 = data compression type 1
                 2 = data compression type 2
```

Incoming Signals (System – – > Device

| Signal Name | Description |
| --- | --- |
| EQUFNCACT | Equipment Function Activate<br>- activate/deactivate 'AT' KBD<br>- activate/deactivate V25bis KBD<br>- activate/deactivate Menu KBD<br>- activate/deactivate no-activity supervision<br>- activate/deactivate long space supervision |
| EQUDATREQ | Equipment Data Request<br>- DTE I/F parameter request |
| EQUSTAUPD | Equipment State Update<br>- call progress update |

Equipment Function Activate

The Equipment Function Activate signal is used by the system to activate/deactivate local functions in the device such as key board dialing, menu interfaces, TX/RX data speeds and formats, etc.

```
Signal Name   EQUFNCACT

Sender:       System
Receiver:     Device
Description:
  D00  XXH   NBYTES
  D01  XXH   OPC/IND
  D02  XXH   SIGNAL #
  D03  XXH   ACTIVATION DATA (See below)
   |    |
  Dxx  XXH   CHECKSUM Detailed Description:

D03  <B7–B0>  0 = DTE I/F = transparent
                 1 = start up mode = 'AT'
                 2 = start up mode = V25bis
                 3 = start up mode = menu
  D04  <B7–B0>  0 = No activation of 'AT' KBD
                 1 = Activate 'AT' KBD
  D05  <B7–B0>  0 = No activation of V25bis KBD
                 1 = Activate V25bis KBD
  D06  <B7–B0>  0 = No activation of Menu I/F
                 1 = Restricted access menu
                 2 = standard menu (language #)
                      |
                 x = standard menu (language #)
  D07  <B7–B0>  0 = No activation of no-activity
                     supervision on TXD
                 1-30 = No-activity supervision
                     on TXD activated (minutes)
  D08  <B7–B0>  0 = No activation of no-activity
                     supervision on RXD
                 1-30 = No-activity supervision
                     on RXD activated (minutes
  D09  <B7–B0>  0 = No activation of long space
                     supervision
                 1-30 = supervision interval
                     (seconds)
  D10  <B7–B0>  0 = No flow control
                 1 = RS-232 circuit switch type
                 2 = Inband
  D11  <B7–B0>  0 = No alternate protocol (DFC)
                 1 = Clear channel DFC handshake
                 2 = Clear channel no handshake
                 3 = DMI Mode 0
                 4 = DMI Mode 1
                 5 = DMI Mode 2
                 6 = ECMA
  D12  <B7–B0>  0 = No error correction
                 1 = Error correction (type #)
```

|     |           |                               |
| --- | --------- | ----------------------------- |
|     |           | 2=Error correction (type #)   |
| D13 | <B7—B0>   | 0=7-bits                      |
|     |           | 1=8-bits                      |
|     |           | 2=9-bits                      |
| D14 | <B7—B0>   | 0=synchronous                 |
|     |           | 1=1-stop bit                  |
|     |           | 2=1.5-stop bits               |
|     |           | 3=2-stop bits                 |
| D15 | <B7—B0>   | 0=No parity                   |
|     |           | 1=Even parity                 |
|     |           | 2=Odd parity                  |
|     |           | 3=Mark parity                 |
|     |           | 4=Space parity                |
| D16 | <B7—B0>   | 0=TX data speed = xxxx        |
|     |           | 1=TX data speed = xxxx        |
|     |           | \|                            |
|     |           | x=TX data speed = xxxx        |
| D17 | <B7—B0>   | 0=RX data speed = xxxx        |
|     |           | 1=RX data speed = xxxx        |
|     |           | \|                            |
|     |           | x=RX data speed = xxxx        |

Equipment Data Request

The Equipment Data Request signal is used by the system to request the current RS-232 interface parameters, data format and speed.

| Signal Name:   | EQUDATREQ |          |
| -------------- | --------- | -------- |
| Sender:        | System    |          |
| Receiver:      | Device    |          |
| Return Signal: | EQUDATMES |          |
| Description:   |           |          |
| D00            | XXH       | NBYTES   |
| D01            | XXH       | OPC/IND  |
| D02            | XXH       | SIGNAL # |
| DO3            | XXH       | CHECKSUM |

Call Status Indication

The Equipment State Update is used by the system to inform the device of a change in state. More specifically it is used to transfer call progress information such as the CP codes now displayed on existing data equipment.

| Signal Name:        | CALSTAIND |                           |
| ------------------- | --------- | ------------------------- |
| Sender:             | System    |                           |
| Receiver:           | Device    |                           |
| Description:        |           |                           |
| D00                 | XXH       | NBYTES                    |
| D01                 | XXH       | OPC/IND                   |
| D02                 | XXH       | SIGNAL #                  |
| D03                 | XXH       | TYPE (See below)          |
| D04                 | XXH       | STATUS (See below)        |
| DO6                 | XXH       | ADDITIONAL DATA (See below) |
| \|                  | \|        |                           |
| Dxx                 | XXH       | CHECKSUM                  |
| Detailed Description: |         |                           |
| D03                 | <B7—B0>   | 0=Data call User State code |
|                     |           | 1=Tele call User State code |
| D04                 | <B7—B0>   | Call Status Indication    |
| D05                 | <B7—B0>   | Call Substatus Indication |
| D05                 | <B7—B0>   | Additional data length    |
| D06                 | <B7—B0>   | Additional data           |
| \|                  |           |                           |
| Dxx                 |           |                           |

Referring now to FIGS. 4, 5, 6, 7 and 8, the five signals described above may be schematically seen. Specifically, the above-described equipment function request signal is depicted in FIG. 4, the equipment data message signal is depicted in FIG. 5, the equipment function activate signal is depicted in FIG. 6, the equipment data request signal is depicted in FIG. 7, and the call status indication signal is depicted in FIG. 8. It may be noted that all five signals include portions 40 identifying the number of bytes in the signal, identity of the relevant device and signal number. Additionally, each signal contains a checksum portion 42, that is, a redundant check in which groups of digits may be summed without regard for overflow, which sum may then be checked against a previously computed sum to verify accuracy. Finally, each signal except that shown in FIG. 7 contains a unique, operative portion 44 which gives the signal its individual functionality as described above.

It should now be fully appreciated by those skilled in the art that the present invention provides a new and useful protocol comprising signals that are function oriented. Using the protocol of the present invention, in systems such as system 10 described herein the number of state tables in the call processing software can be reduced and smarter TAUs accommodated. The present invention facilitates system improvement and performance. Also, the protocol of the present invention allows implementation of a more flexible maintenance and fault recovery because terminal adapters can take care of low level tasks. Still further, the protocol of the present invention facilitates and enhances communication by automated devices became such devices can be easily interfaced to terminal adapters for unattended automatic functions and for taking advantage of local processing power.

Obviously, numerous modifications and variations are possible in view of the above teachings. Accordingly, within the scope of the appended claims, the present invention may be practiced otherwise than as specifically described herein.

What is claimed is:

1. In a switching network including a central switching system and at least one end point device connected to said central switching system, said end point device characterized in part by being in one of a number of states at any one time, and such end point device further characterized by comprising structure maintaining an end point device state table, a protocol for communicating between said central switching system and said at least one end point device comprising:
   a plurality of signals for transmitting information from said end point device to said central switching system; and
   a plurality of signals for transmitting information from said central switching system to said end point device; wherein said central switching system maintains information regarding state of the end point device; and wherein one of said plurality of signals that may be transmitted from said central switching system to said end point device is a signal for informing said end point device of its state via modification of its state table.

2. The protocol of claim 1, wherein said end point device is capable of performing a function, and wherein one of said plurality of signals that may be transmitted from said central switching system to said end point device is a signal for controlling performance of said function by said end point device.

3. The protocol of claim 2 wherein said controlling comprises activating or deactivating said function.

4. The protocol of claim 2 wherein one of said plurality of signals that may be transmitted from said end point device to said central switching system is a signal for requesting a function.

5. The protocol of claim 1 wherein said central switching system and said end point device have an interface therebetween, which interface has certain data parameters associated therewith.

6. The protocol of claim 5 wherein said end point device is capable of detecting data parameter changes, and wherein one of said plurality of signals that may be sent from said end point device to said central switching system is a signal for informing said central switching system of data parameter changes.

7. The protocol of claim 6 wherein said end point device is further capable of maintaining information as to its type and revision state, and wherein one of said plurality of signals that may be sent from said central switching system to said end point device is a signal for requesting data parameters, device type identification, and/or state.

8. A protocol for interconnecting a telecommunications switch and an intelligent peripheral device, which intelligent peripheral device is characterized by comprising structure for maintaining a state table therefor, said protocol comprising:
- at least one signal transmittable from said telecommunications switch to said device; and
- at least one signal transmittable from said device to said telecommunications switch, wherein said telecommunications switch maintains information regarding state of said intelligent peripheral device, and wherein said at least one signal transmittable from said telecommunication switch to said device is a signal for loading information regarding intelligent peripheral state in its state table.

9. The protocol as recited in claim 8, wherein said at least one signal transmittable from said device to said telecommunications switch has a signal number, said wherein said at least one signal transmittable from said said device to said said telecommunication switch comprises a portion identifying the number of bytes in the signal, device identity and signal number.

10. The protocol as recited in claim 9, wherein said at least one signal transmittable from said device to said telecommunications switch further comprises a checksum portion.

11. The protocol as recited in claim 10, wherein said at least one signal transmittable from said device to said telecommunications switch further comprises a functional portion relating to a function request.

12. The protocol as recited in claim 10, wherein said at least one signal transmittable from said device to said telecommunications switch further comprises a portion relating to equipment data.

13. The protocol as recited in claim 8, wherein said at least one signal transmittable from said telecommunications switch to said device has a signal number, and wherein said at least one signal transmittable from said telecommunications switch to said device comprises a portion identifying number of bytes in the signal, device identity and signal number.

14. The protocol as recited in claim 13, wherein said at least one signal transmittable from said telecommunications switch to said device further comprises a checksum portion.

15. The protocol as recited in claim 14, wherein said at least one signal transmittable from said telecommunications switch to said device further comprises a functional portion capable of activating device functions.

16. The protocol as recited in claim 14, wherein said at least one signal transmittable from said telecommunications switch to said device further comprises a functional portion capable of transferring call progress information.

* * * * *

UNITED STATES PATENT AND TRADEMARK OFFICE
CERTIFICATE OF CORRECTION

PATENT NO.   : 5,333,189
DATED        : July 26, 1994
INVENTOR(S)  : Robert S. Clary and Lars T. Rymert It is certified that error appears in the above-indentified patent and that said Letters Patent is hereby corrected as shown below:

```
In the Abstract, line 4:  After "central", insert --system--
Column 1, line 36:  After "point"; insert --devices--
Column 2, line 15:  Delete "Became"; insert --Because--
Column 3, line 21:  Delete "became"; insert --because--
Column 5, line 32:  Delete "glows"; insert --allows--
Column 10, line 31: Delete "became"; insert --because--
Column 12, line 3:  Delete "said"; insert --and--
```

Signed and Sealed this

Twenty-second Day of November, 1994

Attest:

BRUCE LEHMAN

*Attesting Officer*     *Commissioner of Patents and Trademarks*